(12) United States Patent
Fulwiler

(10) Patent No.: US 7,048,980 B2
(45) Date of Patent: May 23, 2006

(54) MEAT LABEL

(75) Inventor: Daniel R. Fulwiler, Algoma, WI (US)

(73) Assignee: WS Packaging Group, Inc., Algoma, WI (US)

( * ) Notice: Subject to any disclaimer, the term of this patent is extended or adjusted under 35 U.S.C. 154(b) by 156 days.

(21) Appl. No.: 10/774,075

(22) Filed: Feb. 6, 2004

(65) Prior Publication Data

US 2004/0157029 A1 Aug. 12, 2004

Related U.S. Application Data

(60) Provisional application No. 60/446,060, filed on Feb. 6, 2003.

(51) Int. Cl.
*B32B 3/00* (2006.01)

(52) U.S. Cl. .................. 428/40.1; 283/81; 426/87; 426/106; 428/41.8; 428/42.1; 428/137; 428/138; 428/192; 428/194

(58) Field of Classification Search ............... 428/40.1, 428/42.1, 192, 194, 137, 138, 41.8; 426/87, 426/106; 283/81
See application file for complete search history.

(56) References Cited

U.S. PATENT DOCUMENTS

| 5,330,777 | A | * | 7/1994 | Mize et al. ................. 426/383 |
| 5,676,401 | A | * | 10/1997 | Witkowski et al. ........... 283/81 |
| 6,520,323 | B1 | | 2/2003 | Colombo |
| 2002/0197425 | A1 | | 12/2002 | Wolf et al. |
| 2003/0017142 | A1 | | 1/2003 | Toner et al. |

* cited by examiner

*Primary Examiner*—Nasser Ahmad
(74) *Attorney, Agent, or Firm*—Thomas B. Ryan; Stephen B. Salai, Esq.; Harter, Secrest & Emery LLP

(57) ABSTRACT

A label is bonded to the inner ply of a two ply barrier film in which an outer ply of the barrier film is removable, leaving the label in place against the inner ply of the barrier film.

8 Claims, 3 Drawing Sheets

MEAT LABEL

CROSS-REFERENCE TO RELATED APPLICATIONS

This application claims the benefit of U.S. Provisional Application No. 60/446,060, filed Feb. 6, 2003, which is hereby incorporated by reference.

BACKGROUND OF THE INVENTION

1. Field of the Invention

The invention relates to labels and in particular to the construction and printing of product-identification labels and to their application to products such as packages of sealed meat.

2. Description of Related Art

The invention is intended among other purposes to solve a labeling problem for products such as pre-packaged meats and other perishable products. Wrapping the products in a special two-ply film can reduce the degradation of such fresh products. The film is wrapped around the products in nitrogen or other inert atmospheric environment. An outer layer of two-ply film provides an oxygen barrier while an inner layer (i.e., the one in contact with the meat) is an oxygen-permeable film. Because of the presence of the oxygen barrier, the useful and safe shelf life of the products is significantly prolonged. However, because of the relative lack of oxygen within the wrapped product, meats particularly tend to take on a purplish hue, which, while harmless, is unpleasant to the eye of the consumer. To return the packaged meat to its natural red color requires that the meat again be exposed to oxygen, which is done by removing the impermeable outer layer of the two-ply film. As a result, oxygen permeates the inner layer and the natural color of the meat is quickly restored.

Labeling of such meat products presents unique problems. Conventional product labeling including information concerning the product, UPC, weight, and use-by date is generally applied to the outside of the wrapped meat. Such labels must be removed and potentially discarded when the market employee peels away the outer impermeable film prior to placing the product on store shelves. This can leave the meat product without proper identification until a new label is applied, which increases chances for mislabeling the product. Re-labeling also adds cost to the product.

BRIEF SUMMARY OF THE INVENTION

The invention assures that product identification labels cannot be readily removed from film-wrapped products while allowing for the removal of an oxygen-impermeable film layer. When the oxygen-impermeable film layer is removed, the new label will remain in place and will not be affected.

To facilitate these ends, a unique method of constructing, printing, and applying a tamper-resistant, product-identification labels is provided. The labels can be die cut to specification, be variably printed, and be automatically applied to the product, which is then sealed so as protect the product from oxidation. The manner in which the label is mounted makes it tamper resistant.

A special on-demand printed identification label can be placed behind the two layers of over-wrapping film in a manner that allows the label to remain intact and yet be viewable by the consumer and store personnel. In order to archive this, the label is automatically applied in the manner described below. Since the label is in contact with the food product, materials suitable for direct food contact are employed in its construction.

Our preferred label comprises a USDA approved two-ply label having a face stock coated with an adhesive approved for direct food contact and having a releasable liner backing approved for incidental contact. This label construction is die cut face and back so that the face stock is cut to a size that is greater than a back cut section in the opposing liner backing. The liner-backing ply is arranged to accept thermal transfer or other on-demand printing. The labels are wound in such a manner that a thermal transfer or an on-demand printer produces images on the liner-backing ply.

The information printed on the liner-backing ply can contain both static and variable printed and imaged information. Such variable information can include UPC codes, weight and date of use; and such static information can include brand names, content, and preparation information. The label is applied to the inside of a film wrap so that the liner backing ply is adjacent to the film wrap by affixing a surrounding portion of the larger face ply to the film wrap using the face ply adhesive.

Preferably, one or the other of the face ply and the liner-backing ply are opaque (e.g., white) and the other of the face ply and the liner-backing ply is translucent and preferably transparent. If the liner-backing ply is transparent, the face stock is preferably opaque to provide a desired contrast with the printing applied to the liner-backing ply. In addition, the face ply can be preprinted with graphics or other information (e.g., logos or general product or supplier information) that is visible through the transparent liner backing ply. Alternatively, if the liner-backing ply is opaque, the face ply is preferably transparent to provide a less obstructed view of the underlying product.

BRIEF DESCRIPTION OF THE SEVERAL VIEWS OF THE DRAWING(S)

DETAILED DESCRIPTION OF THE INVENTION

Figure 1A:
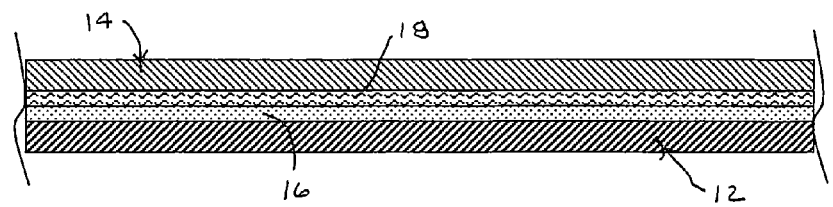
FIGS. 1A–1F illustrate the several steps involved in the construction of a preferred label including on-demand printing.

FIGS. 1A–1F show details of the construction of a two-ply label 10. A face stock 12 is made of a material suitable for incidental meat contact, such as a clear polypropylene. A releasable liner backing 14 is made of white polypropylene coated or otherwise treated with a release layer 18 and non-permanently adhered to the label face stock 12 by a pressure-sensitive adhesive 16 approved for direct food contact. The reason for this, as will become apparent below, is that a tiny amount of this adhesive may come onto contact with the meat product around the edge of the label 10.

Figure 1B:
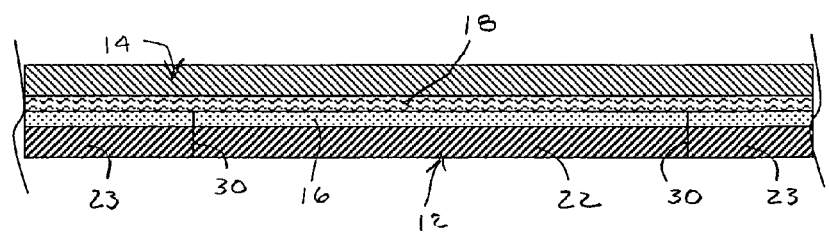
Figure 1C:
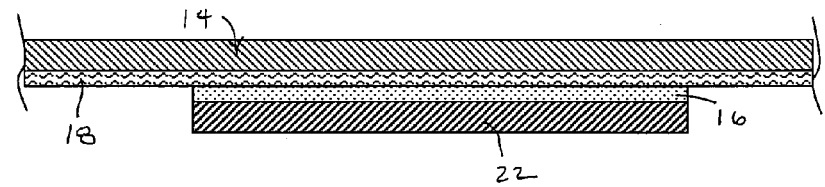
Figure 1D:
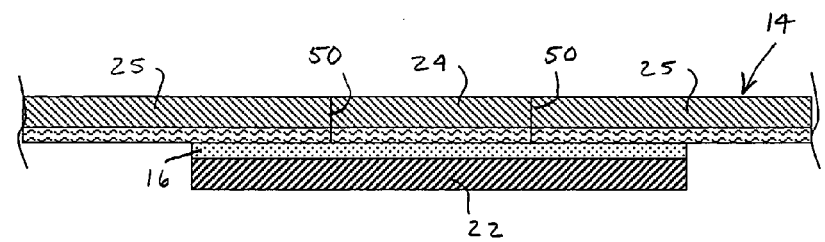

The face stock 12 is die cut along lines 30 as shown in FIG. 1B in an outline that sets the peripheral dimensions of a face ply 22 in the label 10. A surrounding matrix 23 is removed from the face stock 12 as shown in FIG. 1C. The releasable liner backing 14 is similarly die cut along lines 50 as shown in FIG. 1D, which sets the peripheral dimensions of a liner backing ply 24. A surrounding matrix 25 is preferably retained until the labels 10 are ready for printing and application to a food wrap.

Figure 1E:
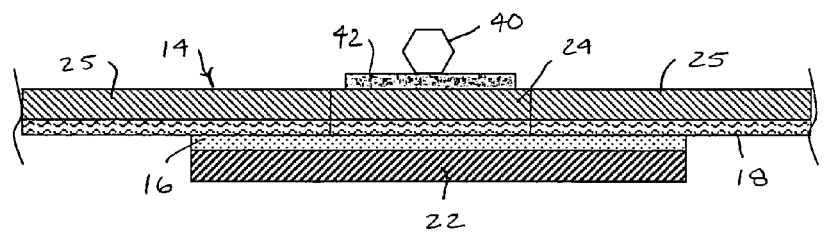

A thermal transfer printer 40 then applies a print layer 42 as shown in FIG. 1E to what is the liner backing ply 24, which conveys information about the meat product about to be wrapped, such as its weight and use-by date as shown in FIG. 1E. Other types of label printers could also be used including ink jet printers. The remaining backing matrix 25 protects the pressure-sensitive adhesive 16 as well as other devices including the printer from contact with the pressure-sensitive adhesive 16 and provides a transport web for advancing a succession of the labels 10 past a printer and into an applicator.

Figure 1F:
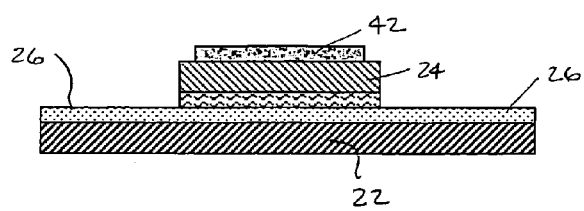

The invention provides for printing the information on the liner-backing ply 24 of the label 10 because the label 10, when adhered to a receiving surface, will in fact retain this section of the liner backing carrying the printed information. The die cut 50 is made so that about ⅜ inches of exposed adhesive 26 will remain around the periphery of the print layer 42 when the rest of the liner backing matrix 25 has been stripped away as shown in FIG. 1F.

The order of the steps depicted in FIGS. 1A–1F can be altered to suit conditions for printing, handling, and subsequent application of the label 10. For example either or both matrices 23 or 25 can be used for transporting a succession of the labels 10, or both matrices 23 and 25 can be removed for applying the labels 10 from a stack. A layer of release could be applied to the exposed surface 13 of the face stock 12 for protecting the adhesive and allowing the labels to be stacked or wound into a roll with the liner backing matrix 25 removed.

Printing can take place at any time, but preferably before the removal of the liner-backing matrix 25. One or both plies 22 or 24 can be preprinted along an in-line press (e.g., a flexographic press) to apply graphics and other information that is not unique to individual packages. For example, logos, nutritional information, preparation information, and other customer communications of a general nature can be preprinted onto the liner backing ply 24 or onto a visible portion of the face ply 22. The surrounding portion of the face ply 22 is visible regardless of the opacity of the liner-backing ply 24. However, overlapping graphics or other information can be rendered visible on the face ply 22 by forming the liner backing 14 of a transparent material. Printing on the exposed surface 13 of the face ply 22 could be rendered visible by forming both plies 22 and 24 of transparent materials.

The adhesive layer 16 is preferably a pressure-sensitive adhesive, such as a water-born acrylic or a hot-melt rubber based material, that is flood coated onto the face stock 12. However, it would also be possible to pattern coat the adhesive to areas required for use. Similarly, the release layer 18, which is preferably a silicone release material, could be pattern coated rather than flood coated onto the liner backing 14 to provide for protecting and releasing more limited zones of the adhesive 16.

The face ply 22 and the liner-backing ply 24 can be made from a variety of materials appropriate for their environment of use. The face ply 22 and the exposed adhesive 26 should be approved for direct food contact, and the liner-backing ply 24 should be approved at least for indirect food contact. The face ply 22 and the adhesive 26 should also be impervious to water and other environmental compounds associated with the packaged product 80 or at least not subject to such environmental damage. The liner-backing ply 24 need not be as resistant to environmental damage, depending upon the level of protection provided by the face ply 22. Examples of workable label stocks include polypropylenes, polyethylenes, polyesters, and OGR papers.

Figure 2A:
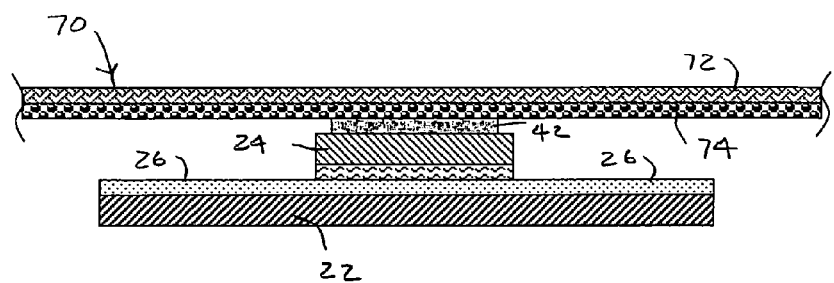
FIGS. 2A–2C illustrate the several steps involved in the application of the label to the wrapping of a food product, and the subsequent removal of an oxygen-impermeable film layer.
Figure 2B:
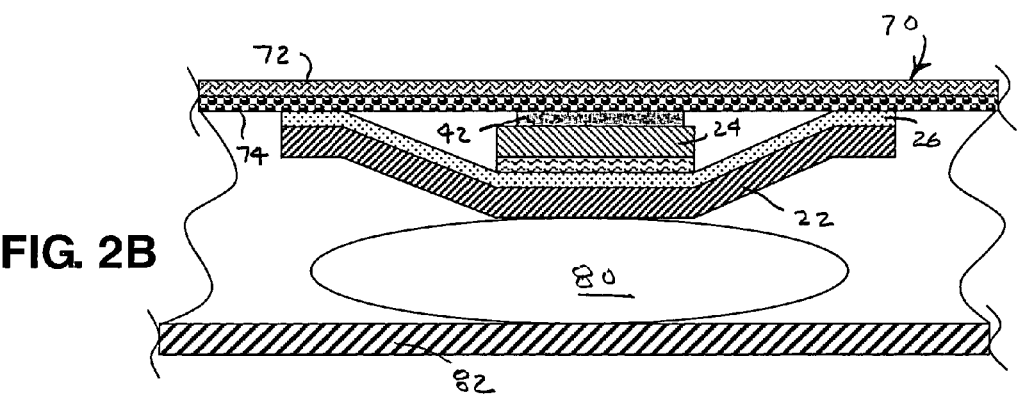
Figure 2C:
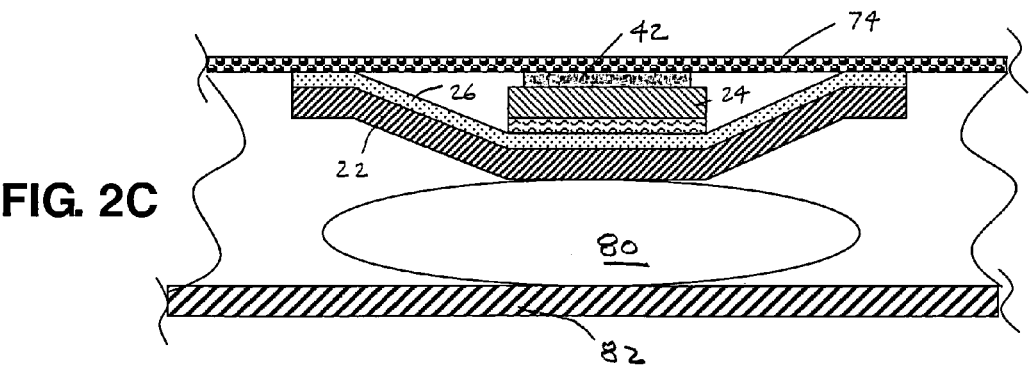

As apparent from FIGS. 2A–2C, the label 10 is now ready to be applied to the two-ply wrap (barrier film) 70 comprising previously constructed layers of an outer oxygen-impermeable film 72 and an inner oxygen-permeable film 74. Both film layers 72 and 74 are transparent.

The label 10 is oriented with respect to the two-ply wrap 70 so that the print layer 42 on the backing ply 24 is adjacent to the inner oxygen-permeable film 74. Also adjacent to the inner oxygen-permeable film 74 is the exposed adhesive 26 on the face ply 22. As shown in FIG. 2B, the label 10 is affixed to the two-ply wrap 70 by pressing the exposed adhesive 26 into contact with the inner oxygen-permeable film 74. The exposed adhesive 26 allows the label 10 to stick to the film layer 74 in an orientation that renders the print layer 42 visible through the two-ply wrap 70. Because the face ply 22 of the two-ply label construction is larger then the liner bottom ply 24, the exposed adhesive area 26 can be brought into contact with the inside layer 74 of the two-ply barrier film 70 without interfering with a view of the print layer 42 through the two-ply barrier film 70.

FIG. 2B also shows how the two-ply barrier film 70 with its applied label 10 can be wrapped against and around a product 80, such as meat, on a tray 82. The oxygen-impermeable layer 72 is on the outside, the oxygen-permeable layer 74 in contact with the meat product 80, and the print layer 42 of the label 10 is visible through both transparent film layers 72 and 74. It is in this condition that the packaged meat product 80 arrives at a supermarket or other point of distribution. The environment 84 within the package is preferably devoid of oxygen (e.g., filled with nitrogen gas) for preserving the freshness of the meat product 80.

FIG. 2C shows that just prior to being placed on store shelves of other point of distribution, the outer oxygen-impermeable layer 72 of the over-wrap is removed to allow oxygen to enter the package environment 84. In so doing, the label 10 is not affected—it remains intact behind what is now the exposed oxygen-permeable film layer 74.

No re-labeling is required after removal of the oxygen-impermeable layer 72, which means there is no chance of mislabeling the product 80. Furthermore, the security of the product label 10 is assured, because it remains adhered permanently behind the sealed film layer 74, which still protects the meat product 80 during handling in the store environment. The print layer 42 is protected from moisture in the meat product 80 by the sealed face ply 22 as well as its own face ply 24.

A small amount of adhesive could, in principle, leak out of the edges 86 of the label 10 and come into contact with the meat product 80, which requires that the adhesive 26 used must be approved for direct food contact.

A variety of conventional pressure-sensitive label stocks can be used for the practice of this invention. Particular material layers are preferably chosen to meet specific requirements of the environment for the intended use of the labels. For fresh food packaging applications, the material layers should be suitable for their level of contact with food.

A label 100 shown in FIGS. 3A–3D also has a two ply construction including a face ply 102 and a liner backing ply 104. The face ply 102 includes a patterned adhesive layer 106, and the liner-backing ply 104 includes a release layer 108. Both the face ply 102 and the patterned adhesive layer 106 should be approved for direct contact with food. The liner-backing ply 104 is discarded prior to mounting the label 100 against the two-ply barrier film 70.

Figure 3A:
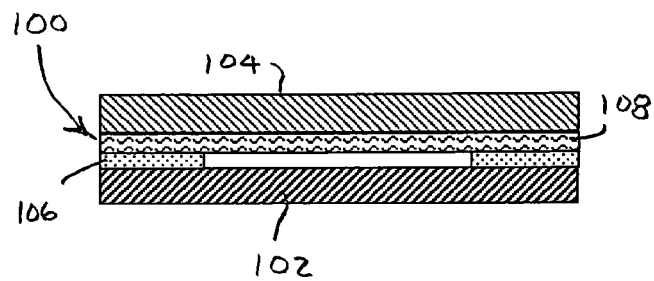
FIGS. 3A–3D illustrate an alternative label construction, its application to a food product wrapping, and the subsequent removal of an oxygen-impermeable film layer.
Figure 3B:
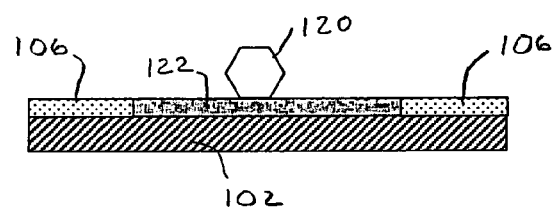

As shown in FIG. 3B, the liner backing ply 104 is discarded prior to printing. A printer 120, which is preferably a thermal transfer printer, prints a print layer 122 on the face ply 102 within a space that is not occupied by the patterned adhesive layer 106. For example, the patterned adhesive layer 106 can be applied in stripes in the printing direction so that the adhesive layer 106 does not contact the printer 120 (i.e., the print head) during printing.

Alternatively, the adhesive could be flood coated onto the face ply 102, and an adhesive deadening agent, such as a release, could be applied in a pattern to form a printable area on the adhesive over which the printer 120 would not come in contact with active adhesive. Other types of printers that do not contact the surface on which they are printing, such as ink jet printers, could be used to apply the print layer 122 directly over the adhesive layer 106.

Figure 3C:
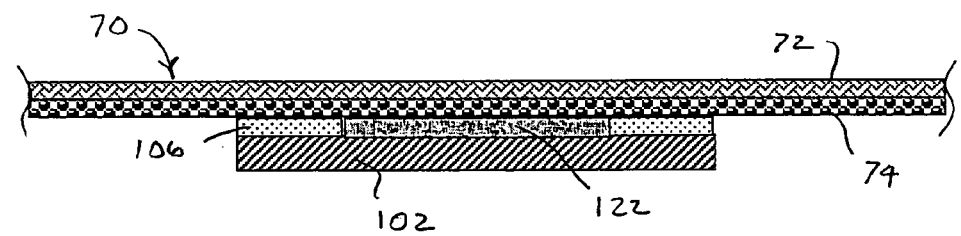
Figure 3D:
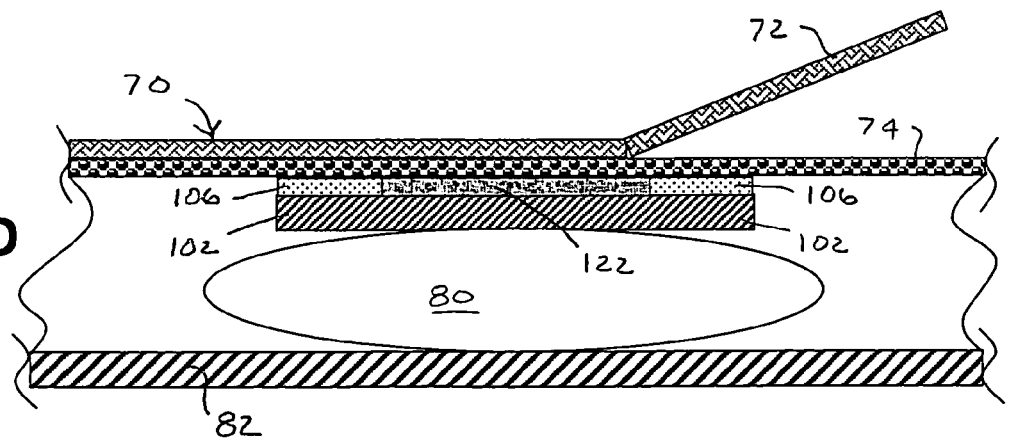

FIG. 3C shows the label 100 applied to the two-ply barrier film 70 with both the patterned adhesive layer 106 and the print layer 122 in direct contact with the inner oxygen-permeable film 74. The print layer 122 is visible through the barrier film 70. FIG. 3D shows the label 100 as a part of the two-ply barrier film 70 wrapped around and in contact with the meat product 80 carried on the tray 82. The outer oxygen-impermeable layer 74 is shown partially removed as a transitional state between the oxygen devoid environment associated with the transport and storage of the meat product 80 prior to its point of sale or distribution and the subsequent oxygenated environment in which the meat product 80 is intended for sale of distribution. Regardless of whether the outer oxygen-impermeable film 74 is present or not, the label 100 remains in place secured to and protected by the remaining oxygen-permeable film 72.

Although a limited number of examples of the invention have been presented in the foregoing description, many other examples will be apparent to those of skill in the art consistent with the teaching of this invention. For example, the labels can be constructed with additional or segmented plies for such purposes as enhancing the presentation of information. Multiple plies, including two plies, can be separately processed (e.g., printed) and assembled upon application to a film wrap. For example, a first web can be fed into the applicator for printing, and a second web can be fed into the applicator for fixing a printed segment of the first web to a film wrap.

The invention claimed is:

1. A product labeling system incorporated into a product wrapping comprising;
    a barrier film having inner and outer plies;
    a label including first and second plies;
    the first ply supporting a layer of printing;
    the second ply supporting a layer of adhesive;
    the first ply being mounted on the second ply exposing the adhesive on an area of the second ply that is beyond the first ply;
    the label being mounted against the inner ply of the barrier film so that both the first ply and the exposed area of adhesive on the second ply are positioned adjacent to the inner ply of the barrier film and the layer of adhesive bonds the label to the barrier film substantially without obstructing a view of the layer of printing through the barrier film; and the barrier film is arranged for wrapping around the product for positioning the label between the barrier film and the product.

2. The system of claim 1 in which the inner ply of the barrier film is an oxygen-permeable film and the outer ply of the barrier film is an oxygen-impermeable film.

3. The system of claim 2 in which the outer oxygen-impermeable film is removable from the product, leaving the inner oxygen-permeable film in place around the product and leaving the label in place between the inner oxygen-permeable film and the product.

4. A product labeling system incorporated into a product wrapping comprising:
    a barrier film having inner and outer plies;
    a label including first and second plies;
    the first ply supporting a layer of printing;
    the second ply supporting a layer of adhesive;
    the first ply being mounted on the second ply exposing the adhesive on an area of the second ply that is beyond the first ply; and
    the label being mounted against the inner ply of the barrier film so that both the first ply and the exposed area of adhesive on the second ply are positioned adjacent to the inner ply of the barrier film and the layer of adhesive bonds the label to the barrier film substantially without obstructing a view of the layer of printing through the barrier film
    wherein the first ply supporting the layer of printing is a liner backing; and the barrier film is arranged for wrapping around the product for positioning the label between the barrier film and the product.

5. The system of claim 4 in which the second ply supporting the layer of adhesive is a face stock.

6. The system of claim 5 in which the liner backing also supports a layer of release located adjacent to the adhesive layer of the face stock.

7. The system of claim 1 in which the first ply is opaque for providing contrast for the layer of printing and the second ply is at least translucent to provide a less obstructed view of the product.

8. The system of claim 1 in which the second ply is made of a material that is safe for contact with food products and the first ply is made of a material that is not as is suitable for indirect contact with food products.

* * * * *